No. 873,420.
PATENTED DEC. 10, 1907.
T. P. FARMER.
RUBBER MAT.
APPLICATION FILED FEB. 10, 1905.
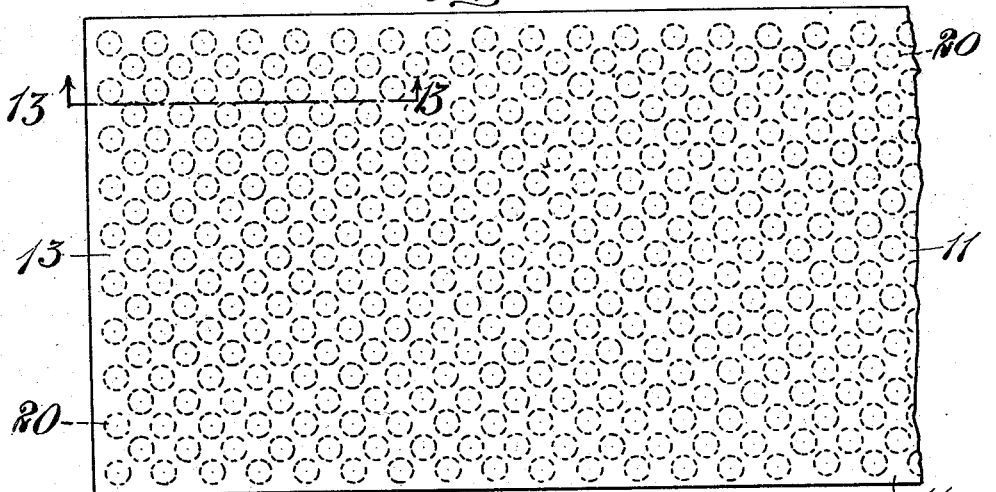
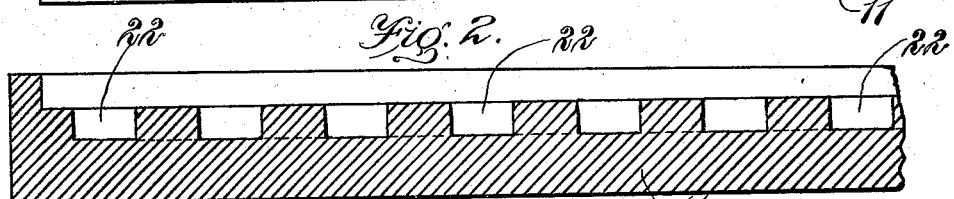
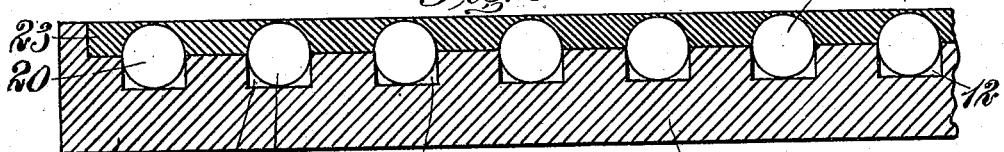
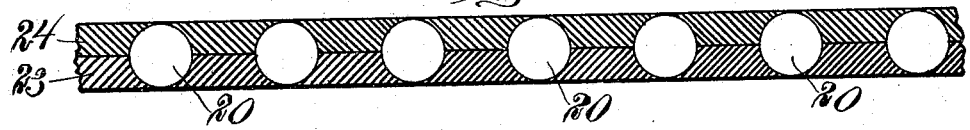
Witnesses:
C. C. Stecher
F. D. Sweet
Inventor
T. P. Farmer
by
Wright Brown...
Attorneys

UNITED STATES PATENT OFFICE.

THEODORE P. FARMER, OF SOUTHWEST HARBOR, MAINE, ASSIGNOR TO PROTECTIVE TREAD COMPANY, OF BOSTON, MASSACHUSETTS, A CORPORATION OF MAINE.

RUBBER MAT.

No. 873,420.  Specification of Letters Patent.  Patented Dec. 10, 1907.

Application filed February 10, 1905. Serial No. 245,082.

*To all whom it may concern:*

Be it known that I, THEODORE P. FARMER, of Southwest Harbor, in the county of Hancock and State of Maine, have invented certain new and useful Improvements in Rubber Mats, of which the following is a specification.

This invention relates to safety treads, and has for its object to provide, as a new article of manufacture, a rubber mat having independent bodies of metal or other wear-resisting material embedded therein and extending practically from face to face thereof, for the purpose of prolonging the life of the mat.

According to the description hereinafter given, these bodies of foreign material are properly spaced from each other and are embedded in the rubber, while it is in its crude state, after which the rubber is subjected to a process of vulcanization, so that the said bodies are caused to adhere to the rubber and are thus prevented from being removed.

On the drawings,—Figure 1 represents in plan view a form of mat embodying the invention, the mat being shown more or less conventionally. Fig. 2 represents a form of holder which is employed for making this embodiment of the invention, said holder having means for positioning and holding the spherical bodies. Fig. 3 represents the holder having the bodies placed therein with a layer of rubber pressed upon the surface thereof, to partially embed the spherical bodies therein. Fig. 4 represents the layer of rubber removed from the holder. Fig. 5 represents in section a portion of the finished mat.

As hereinbefore indicated, the invention consists in its finished form of a layer of rubber having embedded and vulcanized therein, under pressure, a number of independent bodies of spherical wear-resisting material extending substantially entirely through the layer from one face to the other.

In forming the mat, the bodies 20, which are spherical, are positioned in a holder 21 which is provided with a plurality of pockets 22 for receiving them. The depth of the pockets is slightly less than one-half of the diameter of the spheres, so that more than one-half of each sphere projects beyond the surface of the holder. In the manufacture of the mat, a layer of crude rubber is placed upon the holder and is crowded down, so as to partially surround the spheres and cause them to adhere thereto and to become partially embedded therein. After the spheres are embedded in the layer which is indicated at 20 23, the layer is removed from the holder and is placed in another holder with the spheres projecting upwardly, as shown in Fig. 4. Then another layer of rubber is placed thereon and is pressed against the exposed surface of the spheres, the two layers being then subjected to a process of vulcanization under pressure, so as to cause the two layers to become practically integral and to adhere to the spheres. The thickness of the rubber is slightly greater than the diameter of the spheres so as to leave a thin skin over the spheres which becomes worn away as soon as the mat is put in use, so that to all intents and purposes, the spheres extend from one face of the mat to the other.

In forming the mat with the metallic spheres, I find it is preferable to initially construct it of two layers rather than one, as it is difficult to crowd them into the rubber and at the same time to cause the rubber to completely surround them. Therefore it is desirable to first force said bodies into one layer, and to then cover them with another layer, as will be readily understood.

From the foregoing description, it will be observed that, as a new article of manufacture, the mat herein described has many advantageous features, it being flexible, having a large surface of rubber exposed to the wear and yet protected against undue wear by the foreign bodies which receive the weight of the person stepping thereon, and sustain the greater portion of the wear occasioned thereby.

Having thus explained the nature of the invention, and described a way of constructing and using the same, although without attempting to set forth all of the forms in which it may be made, or all of the modes of its use, I declare that what I claim is:—

1. As a new article of manufacture, a mat consisting of a layer of rubber having vulcanized therein a multiplicity of metal spheres.

2. As a new article of manufacture, a mat consisting of a layer of rubber having vulcanized therein under pressure a multiplicity of metal spheres located at predetermined distances from each other.

In testimony whereof I have affixed my signature, in presence of two witnesses.

THEODORE P. FARMER.

Witnesses:
M. B. MAY,
C. C. STECHER.